United States Patent [19]
Mizuno et al.

[11] Patent Number: 6,162,355
[45] Date of Patent: Dec. 19, 2000

[54] CYCLONIC PURIFICATION OF MACHINE TOOL COOLANT

[75] Inventors: Yuji Mizuno, Tokyo; Seizo Igarashi, Kawasaki, both of Japan

[73] Assignee: Kabushiki Kaisha NIKUNI, Japan

[21] Appl. No.: 09/189,815

[22] Filed: Nov. 10, 1998

[30] Foreign Application Priority Data

Nov. 11, 1997 [JP] Japan .................................. 9-308660

[51] Int. Cl.$^7$ .................................................. B01D 21/26
[52] U.S. Cl. ...................... 210/168; 210/248; 210/512.1; 210/416.5
[58] Field of Search .................................... 210/167, 168, 210/170, 196, 197, 232, 248, 416.5, 512.1, 512.2

[56] References Cited

U.S. PATENT DOCUMENTS

4,110,218  8/1978  Marriott et al. ......................... 210/223

*Primary Examiner*—Robert J. Popovics
*Attorney, Agent, or Firm*—Morrison Law Firm

[57] ABSTRACT

A liquid inlet opening of a cyclone filter is connected to a discharge opening of a first pump adapted to pump up untreated liquid coolant contained in a reservoir. The cyclone filter separates the liquid coolant fed by the first pump into clean liquid and dirty liquid as it swirls the liquid coolant. A clean liquid outlet of the cyclone filter is connected to the suction opening of a second pump so that liquid coolant with its pressure increased in the second pump is fed under a high pressure to a machine tool. A dirty liquid return pipe is connected to a dirty liquid outlet of the cyclone filter, with the end of the dirty liquid return pipe submerged in the liquid contained in the reservoir. A flow-directing orifice adjacent the clean liquid outlet of the cyclone filter ensures the dirty liquid flows into the dirty liquid return pipe.

1 Claim, 8 Drawing Sheets

CYCLONIC PURIFICATION OF MACHINE TOOL COOLANT

BACKGROUND OF THE INVENTION

The present invention relates to a liquid treating device for purifying liquid coolant of a machine tool or the like.

Figure 8:
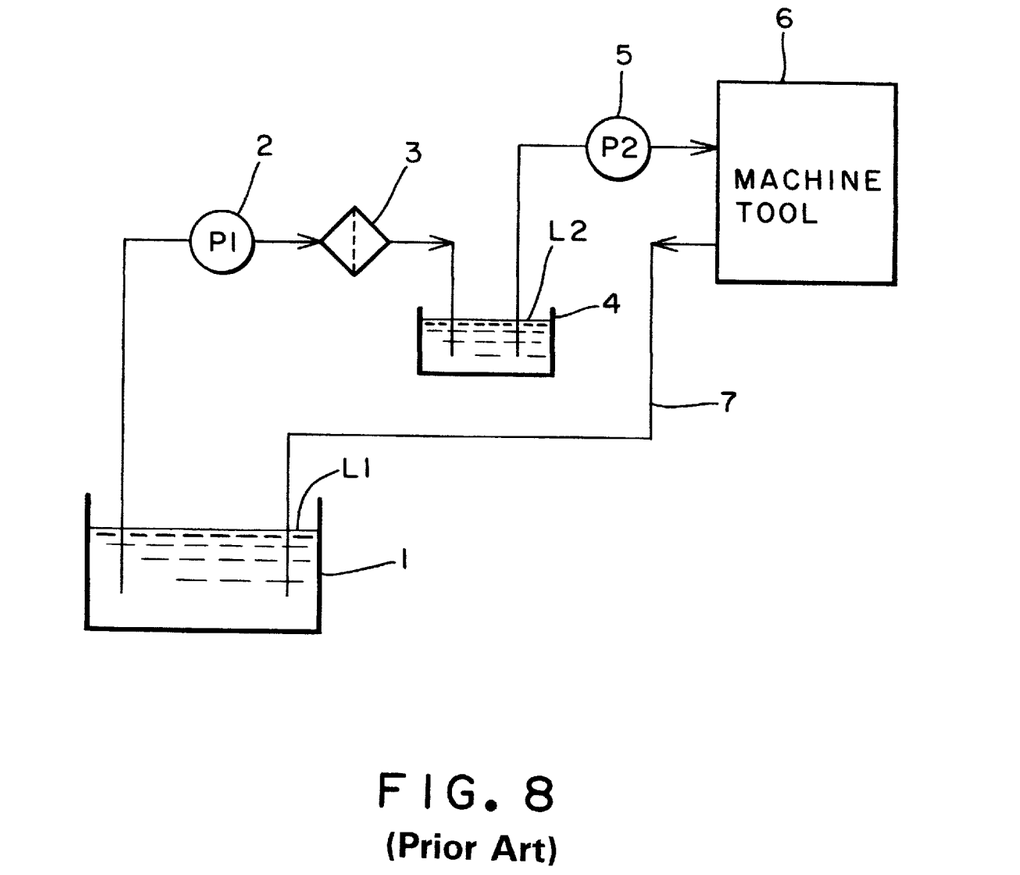
FIG. 8 is a circuit diagram of a liquid treating device according to the prior art.

Referring to FIG. 8, a conventional liquid treating device for purifying used liquid coolant for a machine tool includes a first pump 2 having a suction opening and a discharge opening. The suction opening communicates with untreated liquid coolant L1 stored in a reservoir 1. The discharge opening communicates with an intermediate reservoir 4 through a paper filter 3 so that clean liquid coolant L2, which has been filtered through the paper filter 3, is temporarily stored in the intermediate reservoir 4.

A suction opening of a second pump 5 communicates with clean liquid coolant L2 stored in the intermediate reservoir 4. The discharge opening of the second pump 5 communicates with a machine tool 6 to be supplied with clean liquid coolant. Liquid coolant used by the machine tool 6 is discharged through a pipe line 7 into the aforementioned reservoir 1.

With the structure as above, untreated liquid coolant L1 stored in the reservoir 1 is supplied to the paper filter 3, and liquid coolant L2, which has been purified by means of filtering through the paper filter 3, is fed under a high pressure to the machine tool 6 and ejected to a location where cutting or other processing operation is underway.

OBJECTS AND SUMMARY OF THE INVENTION

The conventional liquid treating device described above tends to be large because it requires intermediate reservoir 4. In addition, since paper filter 3 eventually becomes clogged and has to be replaced, maintenance of the device is a problem.

In order to solve the above problems, the present invention has as its objectives to reduce the size of a liquid treating device and to facilitate its maintenance.

The invention relates to a liquid treating device including a reservoir for storing untreated liquid; a first pump adapted to pump liquid contained in the reservoir; a cyclone filter adapted to swirl and separate the liquid fed from the first pump into clean liquid and dirty liquid; and a second pump adapted to increase the pressure of the clean liquid fed from the cyclone filter and to feed said clean liquid under a high pressure to a target portion where the clean liquid is needed.

With the configuration as above, liquid is fed by the first pump to the cyclone filter, where it is separated into clean liquid and dirty liquid, and the clean liquid is fed to the second pump, which then increases the pressure of the clean liquid and feeds the liquid under a high pressure to a target portion where the clean liquid is needed.

The invention also relates to a liquid treating device wherein the cyclone filter includes a dirty liquid return pipe which is connected to a dirty liquid outlet of the cyclone filter and has its end submerged in the liquid contained in the reservoir, and wherein the cyclone filter also includes a flow-directing orifice, adjacent the clean liquid outlet, for ensuring the flow of dirty liquid into the dirty liquid return pipe.

With the configuration as above, the flow-directing orifice in the cyclone filter serves to increase the internal pressure in the cyclone filter, thereby ensuring the flow of dirty liquid into the dirty liquid return pipe, while submerging the dirty liquid return pipe into the liquid in the reservoir prevents the infiltration of air pressure from the dirty liquid return pipe through the cyclone filter into the first pump. Thus, the invention eliminates the danger of liquid inadvertently draining from the first pump and the cyclone filter when the device is not operated, and ensures that the first pump and the cyclone filter remain filled with the liquid and can be readily restarted.

The invention further relates to a liquid treating device wherein the liquid treating device includes a second pump containing pump fluid in its lower part and having a rotation shaft which projects vertically downward from the lower end of the second pump and serves to operate a pump driving mechanism adapted to use said pump fluid; an electric motor disposed under the second pump in order to drive the second pump; a housing for connecting the second pump and the electric motor together; a coupling for connecting the rotation shaft of the second pump and the rotation shaft of the electric motor together inside the housing; a leakage receiving plate which is disposed under the coupling and fitted to the rotation shaft of the electric motor in a fluid-tight state so as to receive pump fluid which may leak from the second pump; a leakage receiving flange portion protruding from the surface of the inner wall of the housing to the underside of the leakage receiving plate so as to cover the entire circumferential edge of the bottom of the leakage receiving plate; and a leakage recovery opening which communicates with the space defined by the upper end of the leakage receiving flange portion and is open to the outside of the housing.

With the configuration as above, in cases where pump fluid in the second pump leaks from the bottom of the second pump due to a breakdown of the seal or the like and runs along the rotation shaft, the pump fluid is splashed outward by centrifugal force of the rotation shaft and received at the surface of the inner wall of the housing so that the pump fluid descends onto the leakage receiving flange portion. When the rotation operation of the device is at a stand-still, the pump fluid descends along the coupling and other parts onto the leakage receiving plate, which is attached to the rotation shaft of the electric motor in a fluid-tight state. The pump fluid having thus reached the upper end of the leakage receiving flange portion is directed to pass the leakage receiving flange portion and then recovered through the leakage recovery opening so that the danger of the pump fluid entering the inside of the electric motor be eliminated.

The above, and other objects, features and advantages of the present invention will become apparent from the following description read in conjunction with the accompanying drawings, in which like reference numerals designate the elements.

DETAILED DESCRIPTION OF THE PREFERRED EMBODIMENT

Figure 1:
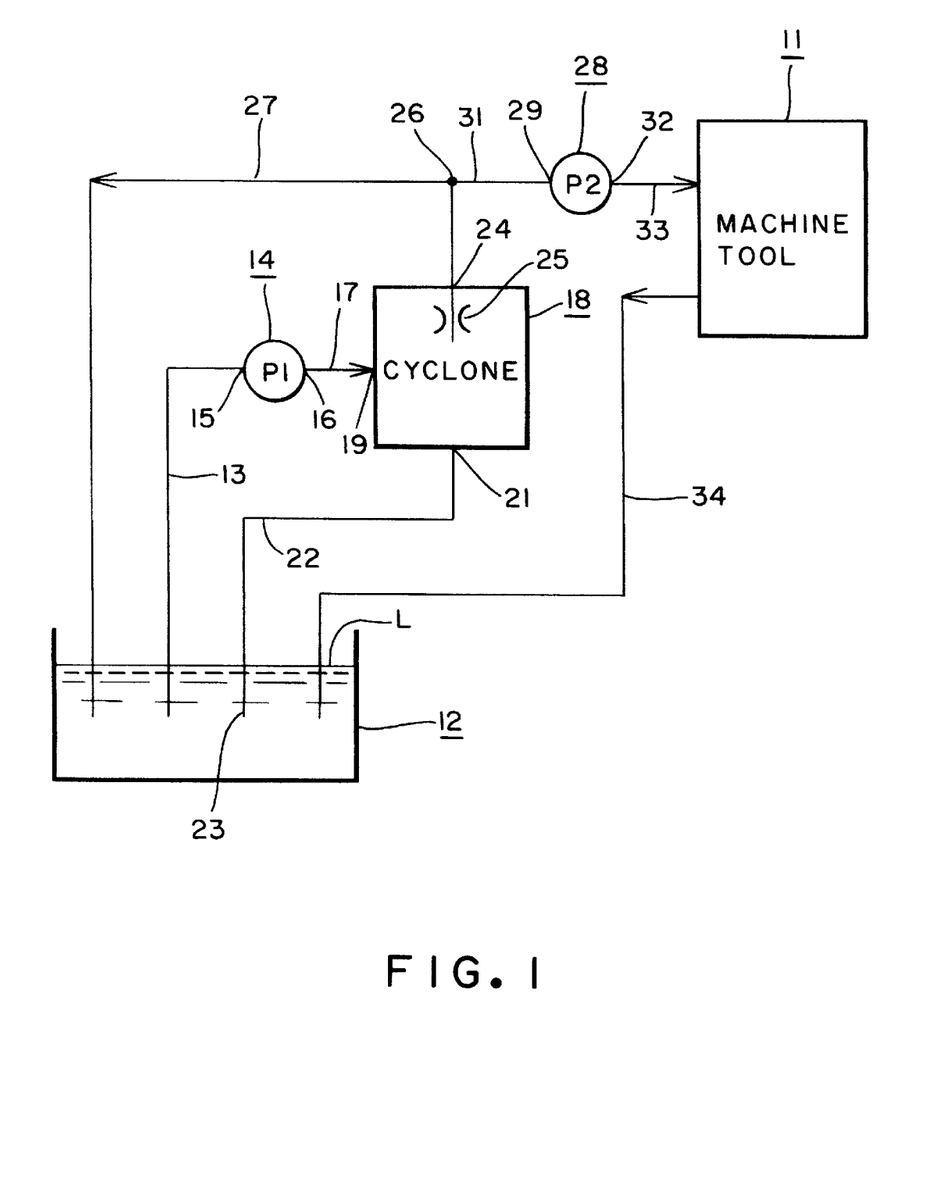
FIG. 1 is a circuit diagram of a liquid treating device according to an embodiment of the present invention.

Referring to FIG. 1, a suction pipe line 13 is inserted into a reservoir 12 for storing untreated liquid coolant L which has been used by a machine tool 11. A suction opening 15 of a first pump 14 for pumping liquid L in the reservoir 12 is connected to the pipe line 13. A discharge opening 16 of the first pump 14 is connected via a pipe line 17 to a liquid inlet opening 19 of a cyclone filter 18.

The cyclone filter 18 is a filter of a type which swirls liquid fed from the first pump 14, thereby separating the liquid into clean liquid and dirty liquid. A lower part of the cyclone filter 18 includes an outlet 21 for discharging dirty liquid. A dirty liquid return pipe 22 for returning dirty liquid into the reservoir 12 is connected to the dirty liquid outlet 21. An end 23 of the dirty liquid return pipe 22 returns the dirty liquid to liquid L in the reservoir 12.

An outlet 24 for clean liquid is provided at the upper part of the cyclone filter 18. Also provided at the side of the cyclone filter 18 where the outlet for clean liquid is located is an orifice 25 for ensuring the flow of the dirty liquid to the dirty liquid return pipe 22.

A T-joint 26 is connected to the clean liquid outlet 24 of the cyclone filter 18 for dividing the pipe line into a pipe line 27 and a pipe line 31. The pipe line 27 returns to the reservoir 12. Pipe line 31 is connected to a suction opening 29 of a second pump 28, which is provided for increasing the discharge pressure.

A discharge opening 32 of the second pump 28 communicates with a target portion of the machine tool 11 to be supplied with the liquid coolant via the pipe line 33. The target portion may typically be a portion adapted to perform cutting operations. Second pump 28 is adapted to increase the pressure of clean liquid fed from the cyclone filter 18 to a sufficiently high level and discharge the liquid under a high pressure to the target portion of the machine tool 11. Liquid coolant, after use at the target portion, is returned through a pipe line 34 into the reservoir 12.

Figure 2:
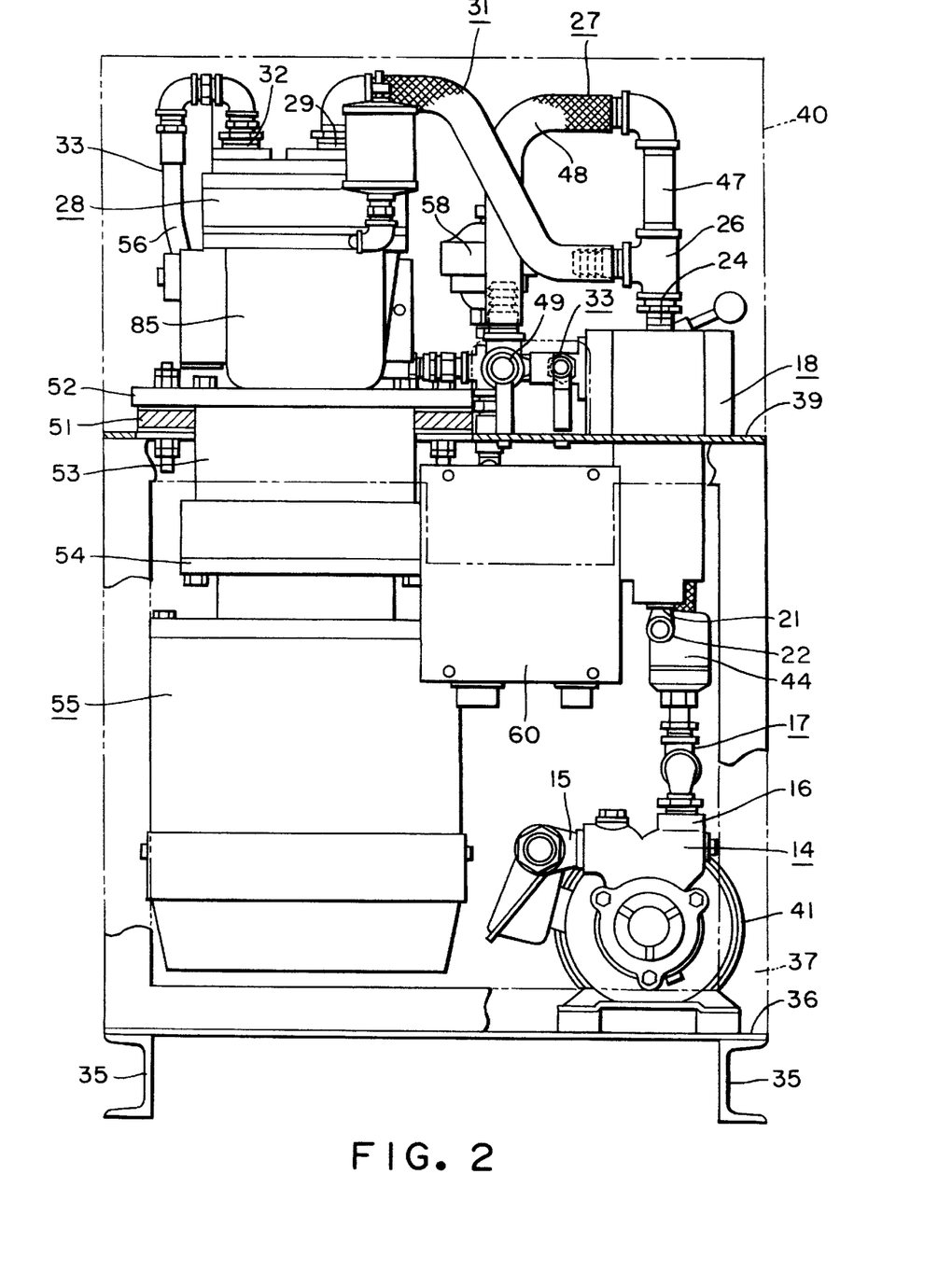
FIG. 2 is a front view of the liquid treating device of FIG. 1.
Figure 3:
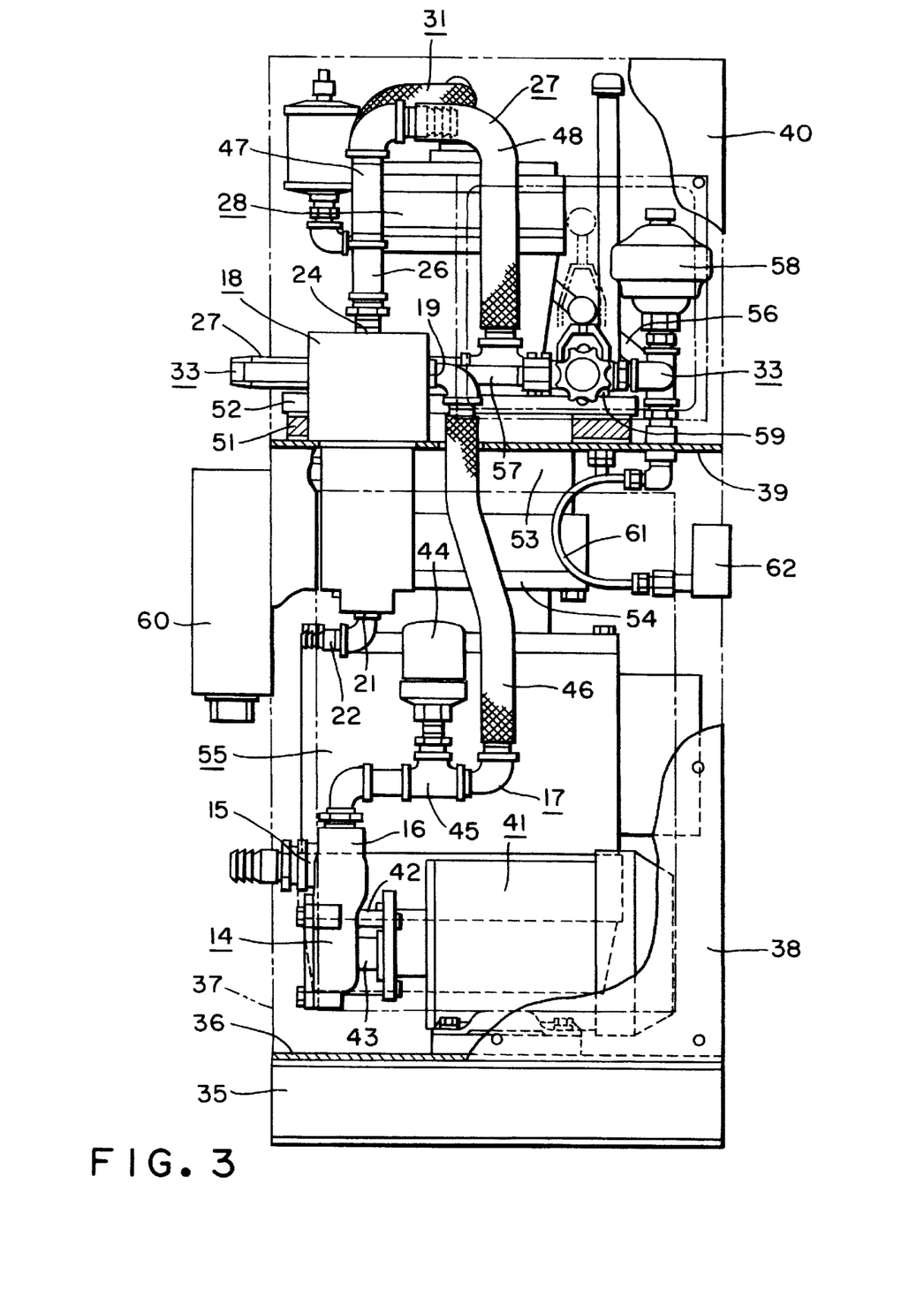
FIG. 3 is a side view of the liquid treating device of FIG. 1.
Figure 4:
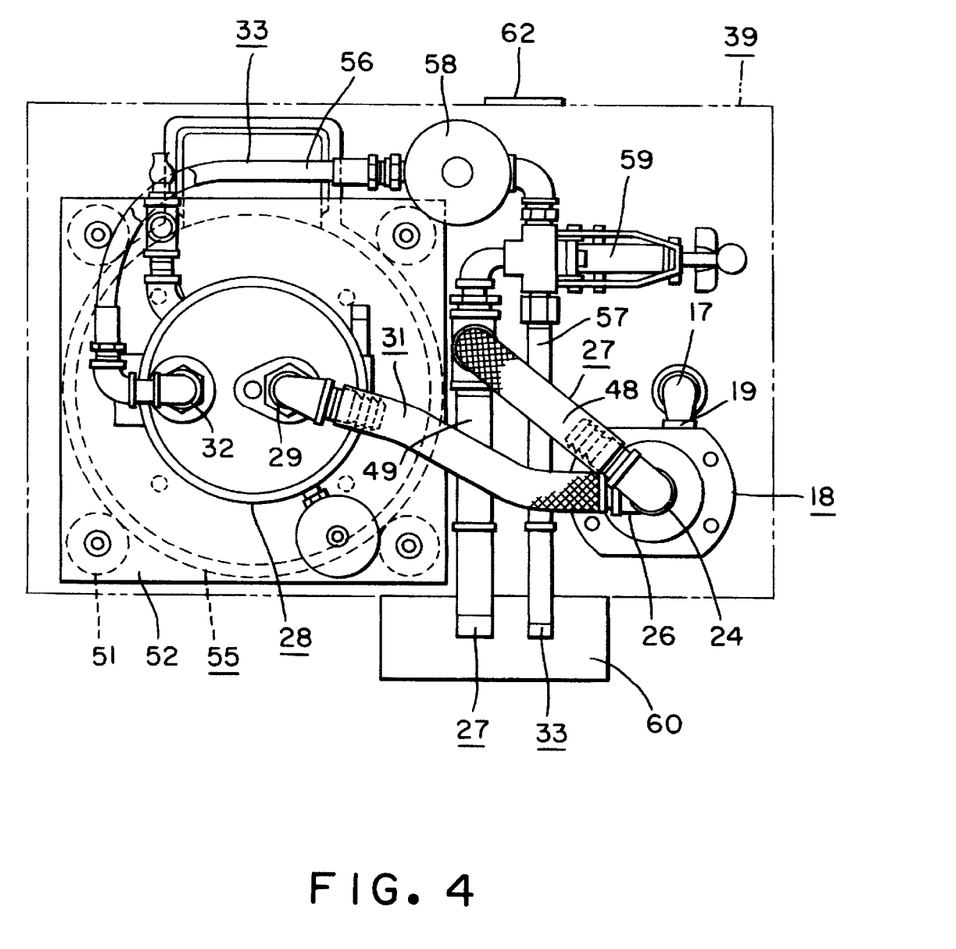
FIG. 4 is a top view of the liquid treating device of FIG. 1.

FIGS. 2 through 4 show a liquid treating device comprising the fluid circuit shown in FIG. 1, that is formed into units. The body of the device includes a pair of U-shaped members 35, a lower mounting plate 36 affixed to the U-shaped members 35, a lower frame 37 attached to the lower mounting plate 36, a lower cover 38 surrounding the lower frame 37, and an upper cover 40 attached to the top of the lower frame 37 with an upper mounting plate 39 therebetween.

As shown in FIG. 3, the first pump 14 is a vortex pump which is attached through a stay 42 to the body of an electric motor 41. The electric motor 41 is affixed to the lower mounting plate 36. First pump 14 is driven by rotation of a shaft 43 of the electric motor 41. A pressure switch 44 for detecting the discharge pressure of the first pump 14 is connected to the pipe line 17 by a T-joint 45. The pipe line 17 includes the T-joint 45, a hose 46 and elbow joints (not numbered).

The pipe line 27, which is directed by the T-joint 26 to return into the reservoir 12, includes a vertically disposed straight pipe 47, a hose 48 and a horizontally disposed straight pipe 49. These components are connected to one another by means of T-joints or the like.

The cyclone filter 18 is mounted directly on the upper mounting plate 39. The second pump 28 is flexibly attached to the upper mounting plate 39 with a rubber vibration isolator 51 and a mounting plate 52 therebetween.

The body of an electric motor 55 for rotating the second pump 28 is solidly attached to the underside of the mounting plate 52 with a housing 53 and a motor mounting flange portion 54 therebetween.

The pipe line 33 connected to the discharge opening 32 of the second pump 28 includes a high pressure hose 56, a straight pipe 57 and elbow joints. An accumulator 58 for smoothing pulsations in the discharge pressure of fluid discharged from the second pump 28 and a relief valve 59 for setting the upper limit of the discharge pressure of the second pump 28 are provided at a point along the pipe line 33. Numeral 60 denotes a terminal box for electrical wiring.

As shown in FIG. 3, a narrow tube 61 branching off from the pipe line 33 is connected to a pressure gauge 62 that is attached to the lower frame 37 to measure discharge pressure of the second pump 28.

Figure 5A:
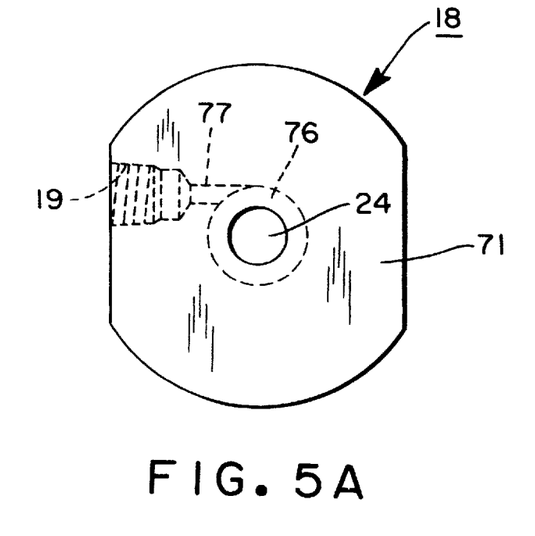
FIGS. 5(A) and 5(B) respectively represent a top view and a sectional view of a cyclone filter used in said liquid treating device.
Figure 5B:
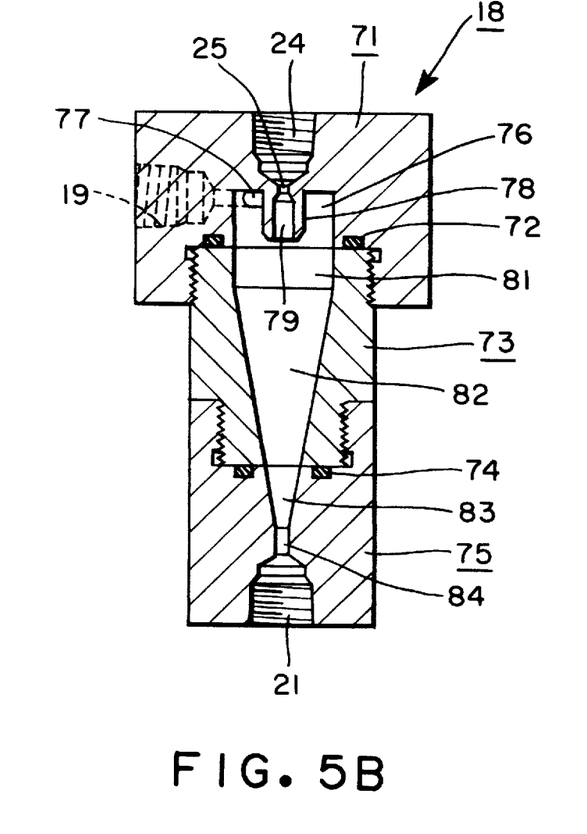

As shown in FIG. 5, the cyclone filter 18 includes a piping connecting portion 71, a main body 73 screwed in the piping connecting portion 71 with an O-ring 72 therebetween, and a liquid discharge portion 75 screwed in the main body 73 with an O-ring 74 therebetween.

The piping connecting portion 71 of the cyclone filter 18 comprises a liquid swirling chamber 76 located at the center of the piping connecting portion 71, a liquid inflow hole 77 extending along a tangent line to the outer circumferential surface of the liquid swirling chamber 76 and communicating with the liquid inlet opening 19, a liquid outflow pipe portion 78 protruding from the center of the liquid swirling chamber 76, and a liquid outflow hole 79 which is located in the liquid outflow pipe portion 78 and communicates with the clean liquid outlet 24.

The liquid outflow hole 79 at the side where the outlet for clean liquid is located is provided with an orifice 25 for ensuring the flow of dirty liquid into the aforementioned dirty liquid return pipe 22.

The main body 73 of the cyclone filter 18 is comprised of an impurity separating chamber 81 located at the upper part of the cyclone filter 18 having the same diameter as the liquid swirling chamber 76, and an impurity precipitating chamber 82 which is located under the impurity separating chamber 81 and gradually narrows downward.

The liquid discharge portion 75 of the cyclone filter 18 comprises an impurity precipitating chamber 83, which is formed as a continuous body with the impurity precipitating chamber 82, and a small-diameter hole 84 at the lower end of the impurity precipitating chamber 83, the aforementioned outlet 21 for dirty liquid being located under the small-diameter hole 84.

Liquid coolant which has flowed from the liquid inlet opening 19 of the cyclone filter 18 along the aforementioned tangent line into the liquid swirling chamber 76 swirls in the liquid swirling chamber 76 downward into the impurity separating chamber 81, where heavy particles in the liquid, such as powder-like chips produced during cutting operation, moves downward into the impurity precipitating chambers 82,83 as the liquid swirls around the outer surface of the impurity separating chamber 81 and is discharged as dirty liquid through the small-diameter hole 84 out of the outlet 21, while the liquid coolant from which powder-like chips or other particles have been removed reverses its direction at the center of the impurity separating chamber 81 and moves upward into the liquid outflow bole 79, from which it flows through the orifice 25 and is pushed out of the outlet 24 as clean liquid.

At that time, the orifice 25 serves to increase the internal pressures in the impurity precipitating chambers 82, 83 and force the dirty liquid through the small-diameter hole 84 out of the outlet 21, thereby restraining unilateral outflow of clean liquid out of the upper outlet 24.

Figure 6:
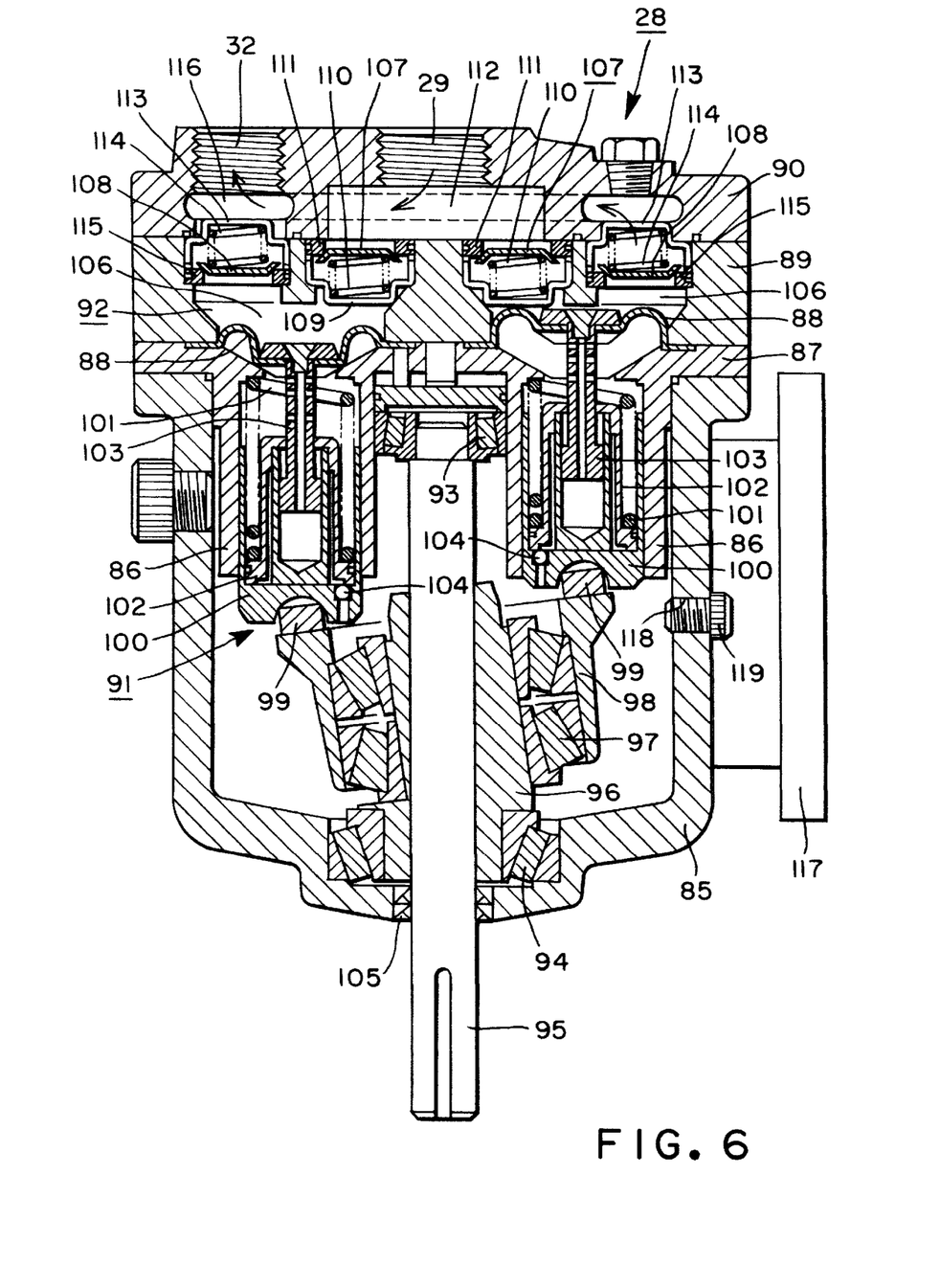
FIG. 6 is a sectional view of a second pump used in said liquid treating device.

As shown in FIG. 6, the second pump 28 includes a lower body 85 adapted to house the pump fluid, i.e. oil, a casting member 87 which is comprised of three integrally formed cylinders 86 and fitted to the upper part of the lower body 85, a valve plate 89 integrally attached to the casting member 87 with three diaphragms 88, and a manifold 89 integrally attached to the valve plate 89.

A pump driving mechanism 91 for vertically moving the diaphragms 88 by means of fluid pressure, in other words oil pressure, is disposed under the diaphragms 88. A pump mechanism 92 adapted to be operated by change in volume resulting from vertical movements of the diaphragms 88 is disposed on the diaphragms 88.

The pump driving mechanism 91 includes a rotation shaft 95 rotatably attached to the lower body 85 by means of upper and lower bearings 93,94, a cam 96 fitted to the rotation shaft 95, a wobble plate 98 attached through cam bearings 97 to the outer surface of the wall of the cam 96 in such a manner as to be capable of moving up and down, and three pistons 100 slidably fitted to the aforementioned three cylinders 86 in such a manner that the indented portions of the pistons 100 respectively catch three feet 99 protruding from the wobble plate 98. The pistons 100 are respectively pressed against the feet 99 by means of compressed coil springs 101 incorporated in the pistons 100. A valve cylinder 102 is slidably fitted in each piston 100, and a valve plunger 103 is slidably fitted in each valve cylinder 102 and connected to the center of the diaphragm 88 associated therewith. Each piston 100 is provided with a ball valve 104 for changing working fluid in the valve cylinder 102.

The rotation shaft 95 permanently projects downward from the lower end of the lower body 55 through an oil seal 105, which is fitted in the bottom hole of the lower body 85 in order to prevent leakage of the pump fluid, i.e. oil, that fills the lower body 85. The rotation shaft 95 is joined to the rotation shaft of the electric motor 55 mentioned above and adapted to be rotated by the electric motor 55 to drive the pump driving mechanism 91 that is adapted to use pump fluid in the lower body 85.

The pump mechanism 99 includes pump chambers 106 formed of the space divided by the diaphragms 88, each pump chamber 106 being provided with an intake check valve 107 and a discharge check valve 108. Each intake check valve 107 is pushed against an intake valve seat 111 by means of a compressed coil spring 110 retained by a spring retainer 109. Each intake valve seat 111 communicates through an indented portion 112 with the suction opening 29, which is provided to be commonly used by all the intake valve seats 111. Each discharge check valve 108 is pushed against a discharge valve seat 115 by means of a compressed coil spring 114 retained by a spring retainer 113. Each discharge valve seat 115 communicates through a passage 116 with the discharge opening 32, which is provided to be commonly used by all the discharge valve seats 115.

With the configuration of the second pump 28 as above, when the rotation shaft 95 of the pump driving mechanism 91 is rotated, the feet 99 of the eccentric wobble plate 98 are successively elevated to push the respective three pistons 100 upward, thereby increasing the pressures of the fluid in the valve cylinders 102 and pushing the diaphragms 88 upward one at a time in turn. When the pressure of the fluid in one of the valve cylinders 102 is being increased, the pistons 100 associated with the other valve cylinders 102 are pushed downward by the restoring force of the compressed coil springs 101 so that the diaphragms 88 associated therewith are lowered. At that time, the working fluid in and out of the valve cylinders are partly exchanged through the ball valves 104, thereby preventing overheating.

With regard to the function of the pump mechanism 92, when the downward motion of each diaphragm 88 increases the volume of the associated pump chamber 106, its discharge check valve 108 is closed while the intake check valve 107 is opened, thereby sucking the liquid coolant from the suction opening 29 of the manifold 90 into the pump chamber 106. When the volume of each pump chamber 106 is reduced by the upward motion of the associated diaphragm 88, its intake check valve 107 is closed while the discharge check valve 108 is opened so that the liquid coolant is gathered into the passage 116 of the manifold 90 and discharged from the discharge opening 32.

As the second pump 28 may be used in the horizontal position where its rotation shaft 25 extends horizontally, the lower body 85 is provided at one side thereof with a support stand 117, which is formed as an integral body with the lower body 85, and an oil drain hole 118, which is closed with a plug 119 screwed therein.

Figure 7:
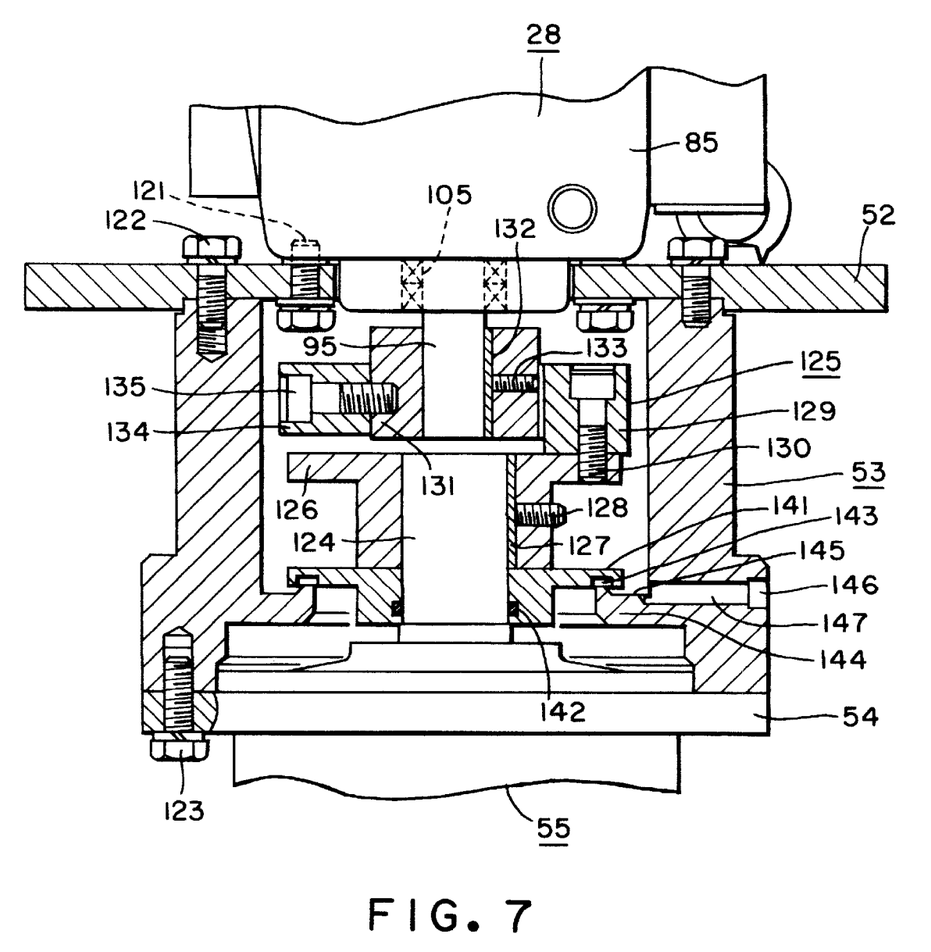
FIG. 7 is a sectional view showing the portion where said second pump is connected to an electric motor.

As shown in FIG. 7, the lower body 85 of the second pump 28 containing the pump fluid is directly affixed to the mounting plate 52 with a bolt 121, the housing 53 is affixed to the mounting plate 52 with a bolt 122, and the motor mounting flange portion 54 for mounting the electric motor 55 that is adapted to drive the second pump is affixed to the housing 53 with a bolt 123.

Inside the housing 53 in which the second pump 28 and the electric motor 55 are joined together, the rotation shaft 95 projecting downward through the oil seal 105 of the second pump 28 is connected to the rotation shaft 124 of the electric motor 55 by means of a coupling 125.

The coupling 125 comprises a flange member 126 solidly affixed to the rotation shaft 124 of the electric motor 55 with a key 127 and a screw 128, a catching member 129 affixed to the top of the flange member 126 with a bolt 130, a boss member 131 solidly fitted around the rotation shaft 95 of second pump 28 with a key 132 and a screw 133, and another catching member 134 affixed to said boss member 131 with a bolt 135.

With the configuration as above, when the coupling 125, the flange member 126 and the catching member 129 rotate as a result of rotation of the electric motor 55, the catching member 129 becomes engaged with the other catching member 134, thereby transmitting its rotation to the rotation shaft 95 of the pump.

A leakage receiving plate 141 for receiving pump fluid, i.e. oil, having leaked from the second pump 28 due to breakage of the oil seal 105 or other causes is disposed under the flange member 126 of the coupling 125 and fitted over an O-ring 142 around the rotation shaft 124 of the electric motor 55 in a fluid-tight state. A leakage drain groove 143 uninterruptedly extending along the circumferential edge of the leakage receiving plate 141 is formed in the underside of the leakage receiving plate 141.

A leakage receiving flange portion 144 having a jaw-shaped cross section protrudes from the surface of the inner wall of the housing 53 to the underside of the leakage receiving plate 141 so as to cover the bottom edge of the leakage receiving plate 141 in such a manner that an indented portion 145 formed in the upper end of the leakage receiving flange portion 144 communicates through a leakage drain hole 147, which is bored in the housing 53, with a leakage recovery opening 146 opened to the outside of the housing 53.

As the structure and function of each mechanism and each component of the embodiment shown in the drawings have been explained, the function of the entire embodiment is explained hereunder.

Referring to FIG. 1, liquid coolant L in the reservoir 12 is fed by the first pump 14 into the cyclone filter 18, which divides the liquid coolant into clean liquid free of chip powder and the like and dirty liquid containing chip powder and other impure substance, and returns the dirty liquid via the dirty liquid return pipe 22 into the reservoir 12 while feeding the clean liquid via the passage 31 to the second pump 28.

At that time, the flow rate of the liquid discharged from the first pump 14 through the orifice 25 of the cyclone filter 18 into the T-joint 26 is so arranged as to exceed the flow rate of the liquid sucked into the second pump 28 so that the first pump 14 forces the liquid into the suction opening 29 of the second pump 28, thereby increasing the suction efficiency of the second pump 28 and preventing the second pump 28 from inadvertently sucking dirty liquid. Excess liquid which could not be sucked into the second pump 28 returns via the passage 27 into the reservoir 12.

The second pump 28 is adapted to conduct suction and discharge operations by means of vertical motion of its diaphragms 88, thereby increasing the pressure of the clean liquid coolant to a sufficiently high level. The second pump 28 also serves to smooth the pulsating pressure of the liquid discharged from the diaphragms 88 by using the accumulator 58, and ejects the liquid under an increased pressure to the target portion of the machine tool 11, where the liquid is needed.

The cyclone filter 18 serves to increase the internal pressure by means of its orifice 25 formed at the side from which clean liquid is discharged, thereby ensuring the flow of dirty liquid into the dirty liquid return pipe 22, which would practically be non existent if the orifice 25 were not provided.

With the end 23 of the dirty liquid return pipe 22 submerged in the liquid L in the reservoir 12, the pressurized air is prevented from entering from the end 23 of the dirty liquid return pipe 22 through the cyclone filter 18 into the first pump 14.

Therefore, the device is free from the danger of liquid inadvertently draining from the suction side of the first pump 14 and the cyclone filter 18 when the device is not operated. The first pump 14 and the cyclone filter 18 remain filled with the liquid and can be restarted quickly.

Referring to FIG. 7, in cases where breakdown of the oil seal 105 or other problems cause pump fluid (oil) in the second pump 28 to leak from the bottom of the second pump 28 along the rotation shaft 95, the pump fluid flows toward the electric motor 55, which is disposed under the second pump 28. Should the pump fluid continue to flow and enter the electric motor 55, it might damage the electric motor 55. According to the configuration of the present embodiment, however, during the operation of the pump, the centrifugal force of the rotation shaft 95 and the coupling 125 splashes the leaked pump fluid outward so that the leaked pump fluid falls along the inner wall surface of the housing 53 into the upper end indented portion 145 of the leakage receiving flange portion 144, flows through the leakage drain hole 147 and there recovered from the leakage recovery opening 146.

When the pump is at a stand-still, pump fluid having leaked from the bottom of the second pump 28 along the rotation shaft 95 due to breakdown of the oil seal 105 or other causes runs along the coupling 125 and other parts to the leakage receiving plate 141. However, the leakage receiving plate 141 is attached to the rotation shaft 124 of the electric motor 55 in a fluid-tight state by means of the O-ring 142. Therefore, instead of entering into the body of the electric motor 55, the pump fluid flows from the upper end indented portion 145 of the leakage receiving flange portion 144 through the leakage drain hole 147 to the leakage recovery opening 146, where the pump fluid is recovered. Thus, the embodiment is capable of preventing the pump fluid from getting into the electric motor 55.

It is thus seen that the above-described device performs a process that comprises feeding liquid to a cyclone filter by means of a first pump, separating the liquid in the cyclone filter into clean liquid and dirty liquid, and feeding the clean liquid to a second pump which then increases the pressure of the clean liquid to a high level and conveys the liquid under a high pressure to a target portion. The invention thus eliminates the need for a conventional intermediate reservoir and therefore enables the reduction of the size of a liquid treating device. As the cyclone filter is free from the problem of clogging, which is unavoidable in case of a conventional paper filter, the device also presents the benefit of maintenance of the device becoming more convenient.

Further the invention includes an orifice formed at the side of the cyclone filter where the outlet for clean liquid is located, and is thus capable of increasing the internal pressure in the cyclone filter and ensuring the flow of dirty liquid into a dirty liquid return pipe. Furthermore, as the dirty liquid return pipe is submerged in the liquid in the reservoir, the air pressure is prevented from entering the first pump through the dirty liquid return pipe and the cyclone filter. Thus, the invention eliminates the danger of liquid inadvertently draining from the first pump and the cyclone filter when the device is not operated, and enables the first pump and the cyclone filter that remain filled with the liquid to be restarted quickly.

Even if a breakdown of the seal or other problems cause the pump fluid in the second pump to leak from the bottom of the second pump to the outside of the pump along the rotation shaft, the invention is capable of receiving at the surface of the inner wall of the housing, the pump fluid splashed by the centrifugal force of the rotation shaft, and directing the pump fluid onto the upper end of the leakage receiving plate. When the rotation operation of the device is at a stand-still, the invention is capable of directing the pump fluid that has descended along the coupling and other parts onto the leakage receiving plate, which is fitted around the rotation shaft of the electric motor in a fluid-tight state, to pass the upper end of the leakage receiving plate and then recovering the fluid from the leakage recovery opening. Thus, the invention is capable of preventing pump fluid from entering into the electric motor and is thereby eliminates the danger of damage to the electric motor.

What is claimed is:

1. A liquid treating device comprising:
   a reservoir for storing untreated liquid;
   a cyclone filter adapted to separate untreated liquid into clean liquid and dirty liquid, said cyclone filter having a clean liquid exit port and a dirt liquid exit port;

a first pump adapted to pump liquid from said reservoir to said cyclone filter;

a second pump adapted to increase the pressure of clean liquid exiting from said cyclone filter and feed the clean liquid to a target portion where the clean liquid is needed;

said second pump includes a lower part, containing pump fluid, and a projecting rotation shaft;

an electric motor, having a rotation shaft, disposed adjacent said second pump;

a housing connecting said second pump and said electric motor together;

a coupling connecting said rotation shaft of said second pump and said rotation shaft of said electric motor together inside said housing;

a leakage receiving plate fitted to said rotation shaft of said electric motor in a fluid-tight state so as to receive pump fluid which may leak from said second pump;

a leakage receiving flange portion extending from an inner surface of said housing to the underside of said leakage receiving plate so as to cover the entire circumferential edge of the bottom of said leakage receiving plate; and a leakage recovery opening which communicates between a space defined by the upper end of said leakage receiving flange portion and is the outside of said housing.

* * * * *